(12) United States Patent
Gorrell et al.

(10) Patent No.: US 6,260,464 B1
(45) Date of Patent: Jul. 17, 2001

(54) IN-SITU IMPLOSION FOR DESTRUCTION OF DANGEROUS MATERIALS

(75) Inventors: John D. Gorrell, Springfield, VA (US); James F. Cullinane, Saratoga; August D. Benz, Hillsborough, both of CA (US)

(73) Assignee: Bechtel Corporation, Houston, TX (US)

( * ) Notice: Subject to any disclaimer, the term of this patent is extended or adjusted under 35 U.S.C. 154(b) by 0 days.

(21) Appl. No.: 09/205,495

(22) Filed: Dec. 3, 1998

(51) Int. Cl.[7] .................................................. F42B 33/00
(52) U.S. Cl. ............................ 86/50; 102/293; 102/303; 588/202
(58) Field of Search .................................... 102/301, 303, 102/333, 293; 86/49, 50; 588/200, 202, 203; 149/124

(56) References Cited

U.S. PATENT DOCUMENTS

| | | | |
|---|---|---|---|
| 3,772,958 | * 11/1973 | Mullarkey | 86/50 |
| 4,389,947 | * 6/1983 | King et al. | 86/50 |
| 4,543,872 | * 10/1985 | Graham et al. | 86/50 |
| 5,613,453 | * 3/1997 | Donovan | 588/202 |
| 5,741,465 | * 4/1998 | Gregg | 588/202 |
| 5,790,963 | * 8/1998 | Welham | 588/202 |

FOREIGN PATENT DOCUMENTS

WO 94/24513 * 10/1994 (WO) ............................ 86/50

* cited by examiner

Primary Examiner—Harold J. Tudor
(74) Attorney, Agent, or Firm—Madan, Mossman & Sriram, P.C.

(57) ABSTRACT

A structure for the destruction of dangerous materials is described which has a destruction location, which may be a pit below ground level. The destruction pit contains the dangerous materials. At least one durable, sealed membrane is present beneath at least a portion of the destruction pit. An overburden mound of soil is provided above the destruction pit; and at least one shaped explosive charge placed adjacent the dangerous materials capable of subjecting the dangerous materials to crushing detonation forces and high heat for a period of time. After detonation of the explosive charge to destroy the dangerous materials and their containers, such as by pyrolysis, the destruction pit is remediated by removal of the waste products. The methods and structures of the In-Situ Implosion (ISI) process can be used in an Engineered ISI embodiment where dangerous materials are brought to a previously prepared site, or in a Direct ISI embodiment where it is too dangerous to move the materials through the public area immediately around their location, and the materials are prepared according to the method and structures of the invention. After destruction of hazardous materials and removal of hazardous residues from the pit, the ISI structure may be re-used or the pit area may be restored.

31 Claims, 7 Drawing Sheets

IN-SITU IMPLOSION FOR DESTRUCTION OF DANGEROUS MATERIALS

FIELD OF THE INVENTION

The present invention relates to methods and structures for destruction of dangerous materials, and more particularly relates, in one embodiment, to implosion and pyrolysis methods and structures for destroying dangerous materials such as conventional munitions, toxic chemical agent-filled munitions, bombs, weapons, and chemical warfare materials (CWM).

BACKGROUND OF THE INVENTION

Open pit burn/open pit detonation (OB/OD) processes have been and continue to be used by the military and law enforcement agencies for emergency and field destruction of conventional munitions, toxic chemical agent filled munitions, terrorist bombs and weapons, and other recovered chemical warfare materials (CWM). Tremendous public and government interest has been generated to develop alternative methods for safe, environmentally responsible methods for the destruction of these types of materials. Environmental regulations have been enacted by state and federal environmental agencies in response to public and private concerns about the safety and efficacy of the OB/OD destruction/demilitarization processes.

A schematic illustration of an OB/OD destruction structure is shown generally as 10 in FIG. 1. The small rectangle 12 at the center of the Figure denotes the zone or area on the surface 14 of the ground 16 in which the materials to be destroyed and the explosive charges used to destroy them are set and assembled prior to detonation. The explosion produces an air shock wave 18, contaminated dust products and contaminated projectiles and fragments 20, resulting in a relatively small crater 22. Prevention of ground water contamination is accomplished by conventional localized clean up.

Disadvantages and problems of conventional OB/OD destruction processes include, but are not limited to, (1) the explosive forces are not fully contained; (2) gases, typically called "off gases", generated from conventional munitions and toxic chemical agent destruction are released directly into the atmosphere; (3) no mechanism is used to prevent seepage and migration of destruction liquid wastes and gases into the ground and underground aquifer; and (4) toxic chemical warfare agents and detonation off-gases may not be completely destroyed in the OB/OD destruction process.

It would be desirable if a structure and method could be devised to overcome some of the problems in the conventional OB/OD) destruction processes.

SUMMARY OF THE INVENTION

Accordingly, it is an object of the present invention to provide a safe, low risk, and low cost method to effectively destroy old, buried or abandoned chemical and conventional munitions, for completely or substantially disarming and destroying paramilitary and terrorist bombs and explosives, and for demilitarizing and decontaminating recovered chemical warfare materials (CWM).

It is another object of the present invention to provide a structure and method for the low risk destruction of dangerous materials which can be practiced either by constructing the In-Situ Implosion (ISI) structure around dangerous materials in place, or by transporting the dangerous materials to a nearby preformed destruction pit and surrounding containment structure.

Another object of the invention is to provide a method and structure for destroying CWM and other dangerous materials while containing contamination.

Yet another object of the invention is to provide a structure for destroying dangerous materials and a method for destroying them that permits a large part of the structure to be reused.

In carrying out these and other objects of the invention, there is provided, in one form, a structure for the destruction of dangerous materials which has a destruction location, where the destruction location contains the dangerous materials. At least one durable, sealed membrane is present beneath at least a portion of the destruction location. An overburden mound is provided above the destruction location, whether it is a below ground pile or an above ground pile; and at least one explosive charge is placed adjacent to the dangerous materials capable of causing the dangerous materials to be subjected to crushing forces and high heat for a sufficient period of time to accomplish partial or complete destruction of the dangerous materials.

After detonation of the explosive charge to crush and destroy the munitions containers (i.e. drums, tanks, munition casings, etc.) and dangerous materials, such as by implosion and pyrolysis, the destruction pit is remediated by removal of the waste products, and the destruction pit is prepared for re-use or is restored to its original condition.

Figure 1:
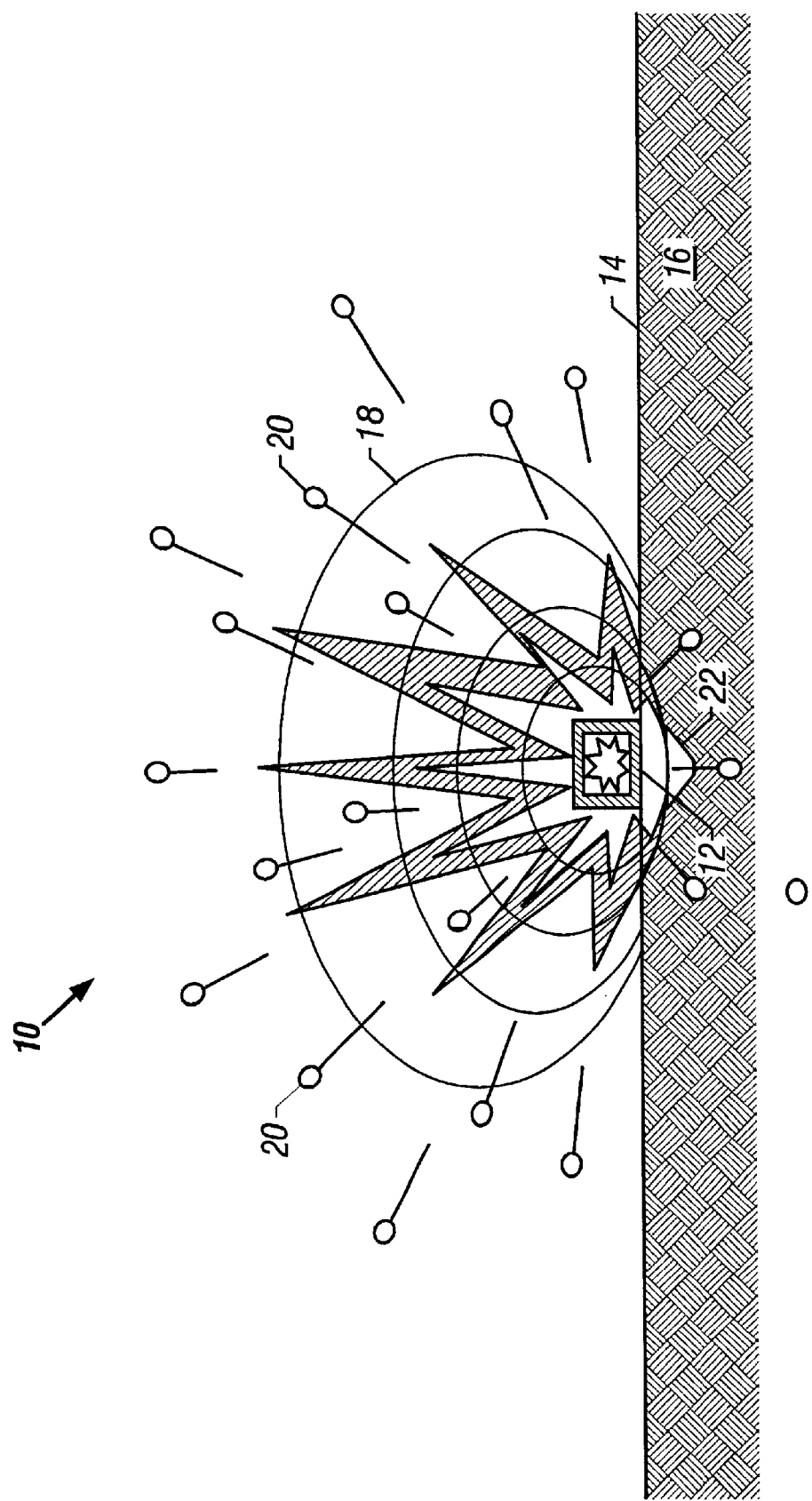
FIG. 1 is a schematic representation of current OB/OD explosion processes in current use by U.S. Army explosive ordnance disposal of non-stockpile recovered chemical munitions.

It will be appreciated that the various Figures may not be to scale or proportion. The scale and proportion may be exaggerated for clarity, and the proportions may vary between ISI projects.

DETAILED DESCRIPTION OF THE INVENTION

The In-Situ Implosion (ISI) process of the present invention offers a safe, low risk, and low cost alternative method to conventional OB/OD processes for effectively destroying old, buried chemical and conventional munitions, for disarming and destroying paramilitary and terrorist bombs and explosives, and for demilitarizing and decontaminating recovered chemical warfare materials (CWM) and other hazardous and dangerous materials.

The ISI process uses explosives and thermite placed around a pile of buried munitions or CWM to effectively break open, crush, and fracture the projectile bodies and material containers and set off the energetic and combustible materials (e.g. fuses, bursters, propellants, explosives, and the like) contained in munitions. The process uses the dense earth mass surrounding the buried munitions pile as a thermal reaction vessel to fully contain implosion forces. Sufficient heat is generated by combustion of the explosives, the agents and the thermite added within the underground munitions burial pit to rapidly detoxify chemical agents and dangerous materials by pyrolysis; and to melt and vitrify the metal container fragments and surrounding non-metallic substances together. Through the use of ISI methods, normal munitions processing and handling risks resulting from leaking munitions or accidental detonation are significantly reduced.

The temperature and pressure conditions used in the ISI invention for destroying via pyrolysis conventional explosive materials and CWM are difficult, if not impossible, to define generally due to the individual nature of the materials being destroyed, the amount of materials being destroyed, the exact ISI structure and the like. However, in very general non-limiting terms, as illustrative examples only, the temperatures achieved in the destruction zone or location may typically be up to and greater than 2500° C., for an hour or greater minimum at the edge of the hazardous material container pile being destroyed, and up to several hours inside the container pile. Instantaneous peak pressures at the explosive interface would typically be up to 80,000 atm or more. The minimum fracture design pressure produced inside the pile would likely be 10,000 atm or more.

Because it depends on gross pyrolysis, ISI is not expected to be overly sensitive to the specific type, mix and/or amount of chemical and explosive materials to be treated; ISI can be used to destroy a broad spectrum of hazardous chemical materials at a wide variety of discovery, storage and destruction sites. Unlike many of the other chemical neutralization demilitarization methods, the ISI process is not constrained by chemical purity, quantity through-put or agent processing rates of reaction. For either Direct or Engineered ISI, a single projectile or many thousand rounds of munitions or items of CWM may be treated simultaneously. The ISI process is designed to ensure safe, non-breaching, fully contained destruction.

The ISI invention is expected to provide a low risk, relatively low cost, and safe method of effectively treating chemical or conventional munitions that are believed to be too dangerous to physically transport or undergo extensive chemical demilitarization processing and handling steps.

ISI satisfies environmental concerns associated with OB/OD and provides numerous operations and safety advantages over OB/OD, which include, but are not necessarily limited to the following:

1. Full containment of implosion/explosion processes:
   The ISI process uses the earth mass and engineered overburden surrounding the chemical agents, munitions, explosives and other CWM to be destroyed as a thermal reaction vessel to fully contain implosion and thermal forces, metal fragments and "off-gases."
   Sufficient earthen overburden and/or explosive containment mats are placed on top of the ISI munitions destruction pit or covered pile to fully contain explosive detonation forces so that surface breaching does not occur.

2. Full containment and treatment of "off gases":
   Gases are trapped and prevented from percolating to the surface of the ISI pit or pile by the earthen overburden which is placed on top of the reaction pit and optionally by an impervious membrane which is installed over the top of the overburden mound.
   The air within the structure is conditioned, scrubbed, and filtered prior to release to the atmosphere.
   Following implosion-detonation of "target" munitions, the gases trapped under the membrane are evacuated and processed through the pollution abatement system (PAS).

3. Protection from liquid seepage and vapor migration into the soil:
   The bottom surface of the ISI destruction pit is covered with a pliant membrane and a thickness of clay forming a durable, self-sealing barrier to keep potential contaminants from leaching into the underground aquifer.
   The membrane and self-sealing clay layer are protected from puncture or penetration during the ISI detonation by a substantial thickness of packed soil fill.
   De-watering and water contamination monitoring wells may be drilled at the periphery of the ISI site. Temporary de-watering is used, if needed, to prevent contamination of the aquifer. Continuous air/water monitoring is conducted during ISI operations.

4. Complete destruction of toxic chemical agents and industrial gases:
   Sufficient heat is generated within the fully contained, underground munitions burial pit or covered pile to rapidly and completely destroy munitions energetics (e.g. fuses, bursters, propellants and explosives) and neutralize highly toxic industrial and chemical warfare agents by pyrolysis.
   Chemical oxidizing reagent materials are placed in the ISI pit to "fix" and react with toxic liquids, solids and reaction gases/vapors. These materials are recovered for further processing and disposal as hazardous wastes.
   In some embodiments, oxygen may be added to destroy munitions, etc. by oxidation.

In general, the ISI process of the invention is an underground implosion process designed to safely destroy conventional and chemical filled munitions and other chemical warfare materials (CWM) or other hazardous and dangerous materials. Two very similar versions of the ISI demilitarization process are embodied: 1) the Engineered ISI process, which is used to destroy munitions and CWM that can or must be recovered and removed prior to being destroyed, and 2) the Direct ISI process, which is used to destroy munitions and CWM which cannot be safely dug up, recovered and/or moved without incurring unacceptable risks to the workforce, the environment or surrounding community.

The ISI process is proposed to be used as the primary decontamination or destruction technology for destroying by pyrolysis the chemical weapons abandoned in China by the Japanese Imperial Army following World War II. In conjunction with the ISI processes, a standard rotary kiln operating in the pyrolysis mode and a Plasma Arc Pyrolysis unit will be used to destroy and treat CW materials as well as thermally treat contaminated dirt, metals, residues, salts, and potentially hazardous materials from the ISI process as necessary to complete the demilitarization job in China.

Figure 2:
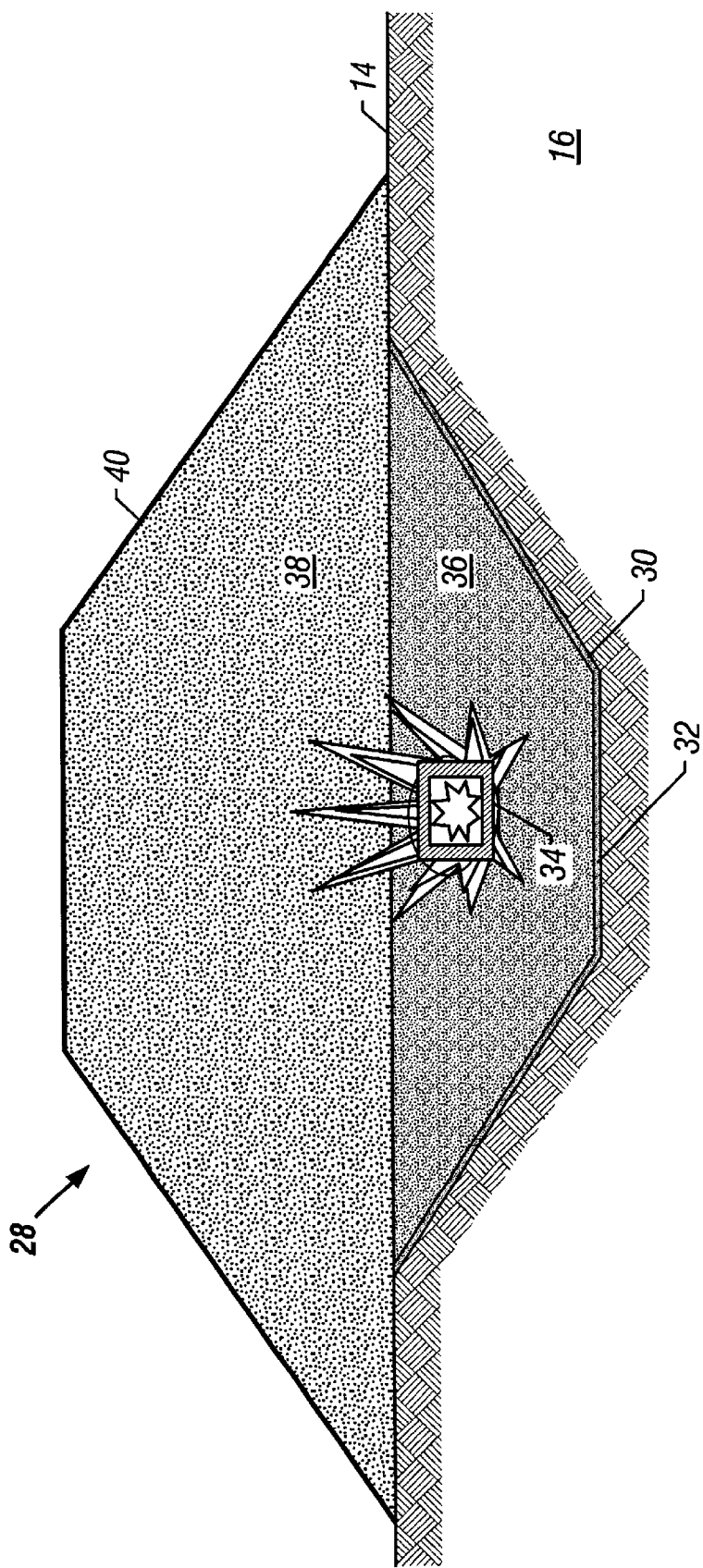
FIG. 2 is a schematic general illustration of the contained, underground In-Situ Implosion process (ISI) of this invention for improved worker, public and environmental safety.

Referring to FIG. 2, the general ISI structure for destruction of dangerous materials is generally referred to as 28. A destruction pit 30 is provided in the ground 16 and lined with at least one durable, sealed membrane (heavy black line) 32 which prevents groundwater contamination. Commonly available reactive decontamination chemicals are placed around the munitions pile or other dangerous materials to be destroyed. Shaped charges and/or other explosive charges are placed around the munitions pile. The munitions pile together with the charges form the destruction location shown by the small rectangle 34. The munitions pile may be below ground level and covered with packed dirt refill 36 and an overburden mound of earth 38 which, together with an optional, durable, sealed membrane 40 above the destruction pit, prevents airborne contamination and the escape of explosive forces. When the implosion charge (shaped charge) is detonated, the munitions pile is subjected to very high pressures for a short time in order to crush the munitions or containers and relatively high temperatures for a relatively long time after the event in order to thermally treat the dangerous materials. In one embodiment of the invention, the temperatures achieved should exceed 2700° F. (1482° C.) sufficient to melt steel, or more; and preferably are up to and in excess of 3200° F. (1760° C.) to melt silica and decompose limestone. Depending upon the amount of materials being destroyed, the particulars of the materials, the nature and design of the explosive charges used to destroy the dangerous materials, the destruction pit 34 could be exposed to these very high temperatures for minutes, hours or even days, depending on size and energy released. An important feature is that sufficient pressure and heat is concentrated upon the materials for a sufficient period of time to effectively destroy them by rupturing the containers and destroy all dangerous materials without breaching the surface of the overburden and render them harmless and/or capable of being recovered and disposed of in a safe manner.

ISI Process Procedure: Set Up and Operations for Munitions Destruction

ISI Pit Preparation and Munitions Recovery

Temporary enclosures (not shown) are erected over the munitions burial pits to protect workers during site preparation for Direct ISI processing or for munitions recovery required for Engineered ISI operations. Additionally, temporary enclosures are used to store small quantities of munitions in the immediate vicinity of the Engineered ISI location. The air within these facilities is conditioned and filtered. Recovered munitions are placed in preformed, untreated wood or plastic boxes for bulk handling convenience and transported from the storage facilities or burial pits, such as by truck, to the Engineered ISI pit location. Continuous agent monitoring at the recovery pit surface and downwind is conducted throughout either the Direct or Engineered ISI processes.

Engineered ISI

Figure 3:
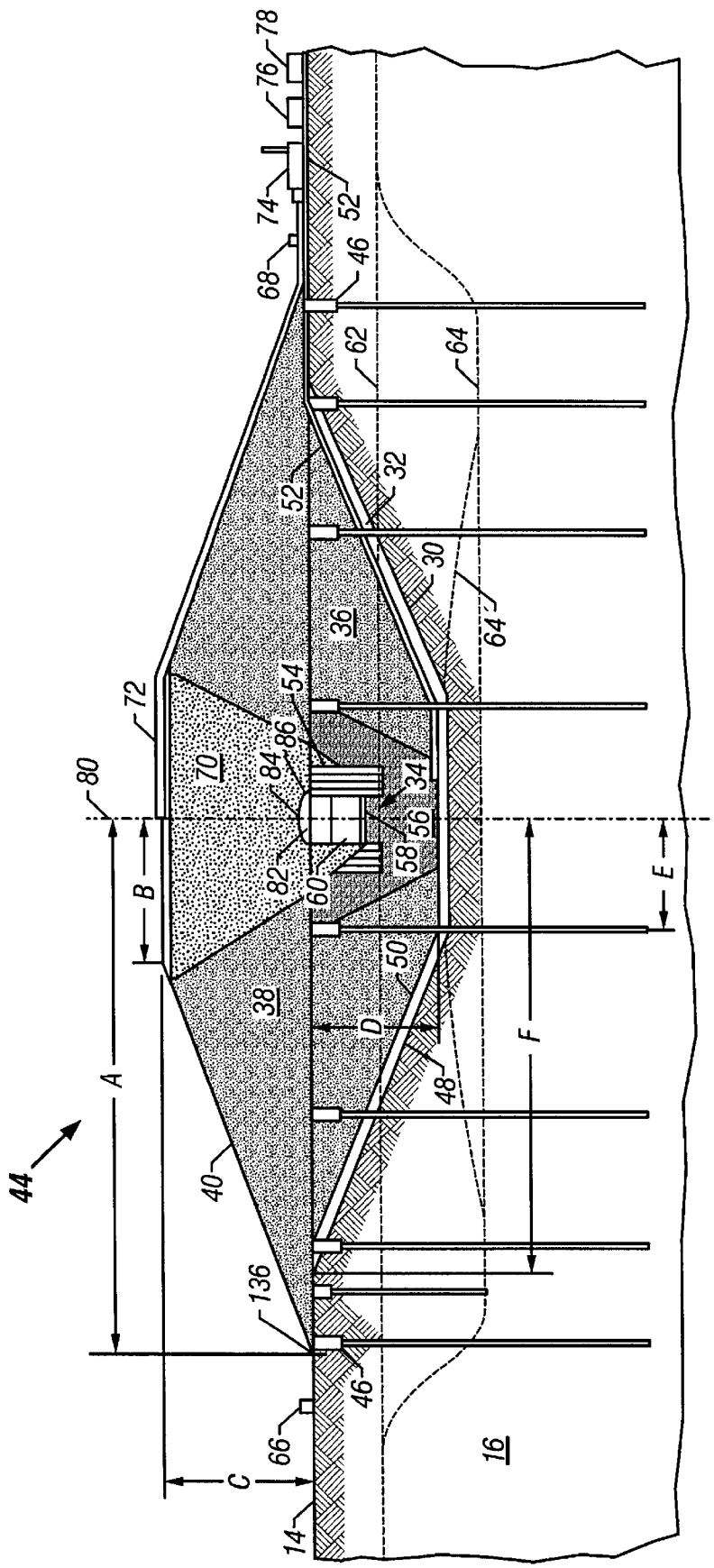
FIG. 3 is a schematic, vertical, cross-section of an Engineered implosion pit in accordance with the ISI invention.

Referring to FIG. 3, in vertical cross section, the Engineered ISI structure is generally referred to as 44. Demilitarization pit 30 is constructed at a site near the munitions burial pit or storage area. Risk assessment must be made of the selected site, allowing for appropriate explosive Quantity-Distance (QD) separation for public access and safety of the operating crew during set-up and mission execution. The QD for a small (1–50 munitions) destruct pit is 204 meters and for larger destruct pits (50–5000 munitions) the QD is 381 meters. Quantity distances are based on current U.S. military explosive safety standards. The ISI structure 44 is designed and constructed to prevent surface breaching and release of potentially hazardous materials to the atmosphere.

Figure 5:
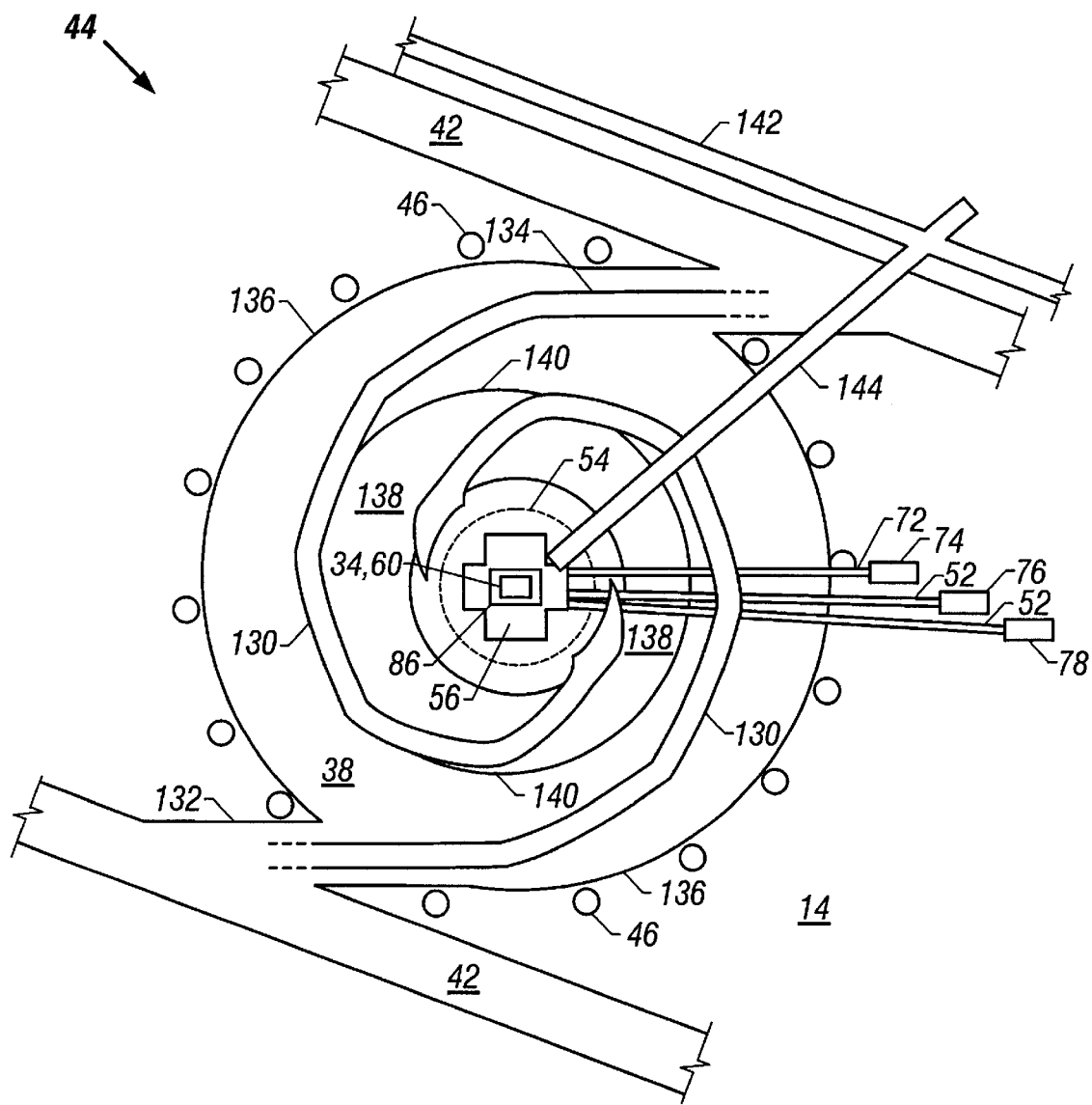
FIG. 5 is a schematic, sectional plan view of a destruction pit during remediation.

The site is cleaned of vegetation, leveled and access roads 42 constructed (see FIG. 5). De-watering and contamination monitoring wells 46 are drilled at the periphery of the finished ISI structure 44. Wells 46 are fluid conduits for injecting and/or removing fluids, where fluid has its generally accepted meaning of either gas or liquid. In one non-limiting embodiment, these wells may be from 100 to 300 ft (30.5 to 91.4 m) deep. These dewatering wells can help lower natural high water table level 62 to locally depressed water table level 64 during operation of the Engineered ISI structure 44, if necessary, to avoid contamination. Locally depressed water table level 64' may be higher directly beneath destruction location 34 because the wells 46 cannot be directly beneath destruction location 34. That is, locally depressed water table level 64/64' would have bulge 64' toward destruction location 34. In one non-limiting embodiment, the distance from the surface 14 to locally depressed water table level 64 may range from 50 to 60 ft. In another non-limiting embodiment, the distance from the bottom of destruction pit 30 to locally depressed water table level 64' may range from 4 to 6 ft.

A careful survey of pre-existing chemical contamination is conducted to gain a good background database for the subsequent monitoring operations. Then a deep basin or pit 30 is excavated in the ground. The bottom surface is covered with one or more plastic sheet(s) 48 and a thickness of clay 50, forming a durable, sealed membrane 32 to keep potential contaminants from leaching or migrating into the surrounding soil and/or underground aquifer. The structure of durable, sealed membrane 32 may be seen more clearly in FIG. 4A. In one embodiment of the invention, membrane 32 may be understood as "self-sealing" from the pressure of the packed earth refill 36 above it and due to the pressure of a thick layer of finely divided clay. In another non-limiting embodiment, membrane 32 may be from 4 to 6 ft (1.2 to 1.82 m) thick, particularly at a the bottom of pit 30.

Pipe or conduits 52 are placed inside the pit 30 along the sloping sides to serve later as means for adding or removing gases and decontamination liquids, if needed. The pit 30 is back filled with packed earth refill 36, and vertical sheet piles 54 (see FIG. 3) are placed near the center of the pit 30 to serve as physical constraints to the possibility of cave-in. These sheet piles 54 may be corrugated steel or any other suitable material. Layers of pea gravel (silica), and crushed limestone (calcium carbonate) 56 are put into the pit nearest the destruction location 34. Calcium carbonate is used to neutralize acidic and other dangerous chemical compositions that may erupt from the container pile 60, although it will be understood that other reagents could also be employed.

A layer of thermite (aluminum powder and iron oxide powder) and implosion charges 58 are placed next onto the bottom layer of the destruction location 34 (central bottom of pit 30). This provides some of the energy to break open the munitions and some of the thermal energy to thoroughly heat and pyrolyze and destroy the toxic materials and chemical agents contained therein. The boxes with munitions are positioned in a pile 60 in the center area of the destruction location 34 in the center of pit 30. To ensure complete rupture of the inner-most munitions within each box in the pile 60, relatively small implosion charges 94 are placed between the inside munitions. The bulk of the implosion charges 110 and initiation sheet charges 112 are added to the outside surfaces and on top of the pile 60. More details are given in FIGS. 4A and 4B and the discussion thereof.

Destruction location 34 may have an air pocket 82 thereover for prevention of surface breaching directly over the pit 30. This is done by dispersing the explosive shock wave laterally outward around the air pocket using explosive wave shaper technology. Air pocket 82 may have a water seal membrane 84 thereover to protect the charges in and around the container pile 60 from moisture contamination, and a corrugated steel support cover 86 (which may be of any other suitable material) to prevent premature collapse of the packed sand and gravel overburden 70 over the sensitive initiation train and prevent it from being unintentionally destroyed during construction.

Compacted backfill 56 consisting of crushed bulk limestone and pea gravel are placed around and above the container pile 60. The pit 30 is then covered to a specified height with an overburden mound 38 consisting of packed earth to prevent surface breaching during the implosion. Packed sand and gravel overburden 70 may be provided in the center of and within overburden 38 directly over the destruction location 34. Packed sand and gravel overburden 70 is designed to cave into and crush container pile 60, and is thus understood to be in an impulse heave affected zone. A cascading surface initiation train is used in constructing implosion charges to uniformly distribute initiation of the explosives around the entire surface of the munition pile 60 from a single or limited number of discrete initiation points. This is the best way to create a powerfully concentrated isotropic event. The slope between packed sand and gravel overburden 70 and packed dirt overburden 38 may be from 60° to 80° inclined angle. A thin plastic, heat sealed membrane or sheet 40 is optionally installed over the top of the overburden mound to trap any potentially contaminated gases percolating to the surface.

Other features of the Engineered ISI structure 44 shown in FIG. 3 are first dual remote firing unit 66 with electronic delay circuitry, and second dual remote firing unit 68 with electronic delay circuitry, both for detonating at least one explosive charge for destroying the container pile 60 and contents. Firing units 66 and 68 are wired to the charges placed in and around container pile 60 via buried firing cable conduits. These are remotely controlled and redundant in the event of failure of one of the units 66 or 68.

Pit gas emission monitoring pipe or conduit 72 is placed on top of overburden 38 to collect gases, such as would be trapped by heat sealed, heavy duty plastic sheet vapor trap cover 40 for removal of contaminated gases. Pipe 72 may run to mobile pollution abatement system (PAS) 74. Mobile fluid pumping system 76 and mobile air or gas compression system 78 may be provided, if needed.

In order to provide a sense of scale of the Engineered ISI structure 44, some possible, non-limiting dimensions are given as examples that may be used when specifying Engineered ISI structure 44. While it is not required that the ISI structure such as 44, have a circular plan, as seen in FIG. 5, it is expected that a circular layout will be the most common configuration because it is an isotropic event. However, it should be understood that other geometries are contemplated as long as the purposes of the invention are achieved.

Center line 80 marks the geographic center of Engineered ISI structure 44, as seen in FIG. 3. The dimensions shown in FIG. 3 are defined as follows:

A=radius of overburden 38 at the toe or bottom 136;
B=radius of overburden 38 and 70 at the top;
C=height of overburden 38 and 70;
D=depth of destruction pit 30;
E=width of destruction pit 30 at the bottom; and
F=width of destruction pit 30 at the top, i.e. surface 14.

Table I gives non-limiting, approximate amounts for these dimensions, in meters, for small, medium and large chemical warfare (CW) amounts.

TABLE I

Proposed Dimensions of Engineered ISI Structure, in Meters

|  | A | B | C | D | E | F |
|---|---|---|---|---|---|---|
| Small, 50 Piece CW Site | 18 | 9 | 6 | 8 | 4 | 14 |
| Medium, 500 Piece CW Site | 30 | 12 | 9 | 11 | 6 | 23 |
| Large, 5000 Piece CW Site | 44 | 16 | 18 | 15 | 9 | 34 |

Figures 4A, 4B:
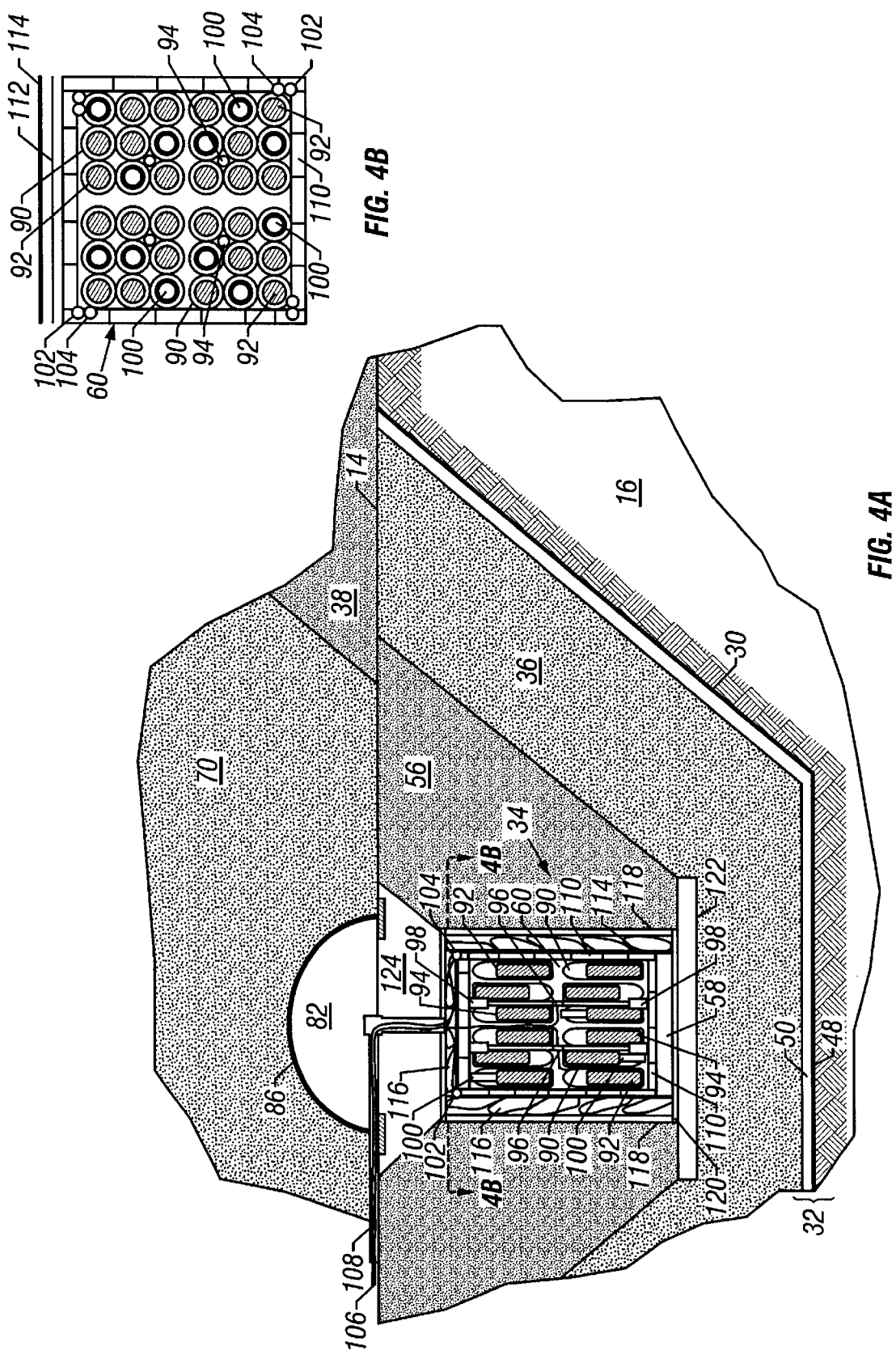
FIG. 4A is a schematic, vertical, cross-section of an Engineered implosion pit set up for a specific embodiment for the destruction of 72 each 155 mm chemical warfare (CW) projectiles.
FIG. 4B is a schematic, horizontal, cross-section of four double stacked boxes of CW projectiles with explosives and agents installed taken along line 4B—4B of FIG. 4A.

FIGS. 4A and 4B provide more details. FIG. 4A is a schematic illustration in partial vertical cross section of an Engineered implosion pit engineered to destroy 72 each 155 mm CW projectiles 90, in one non-limiting embodiment of how the ISI invention would be implemented. The top view of four double-stacked boxes of 9 CW projectiles 90 in FIG. 4B taken along line 4B—4B of FIG. 4A gives further details about how the Engineered ISI method and structure would be applied to a specific situation. The chemical agent 92 within each CW projectile 90 is shown in black in these Figures.

It will be appreciated that it is impossible to give specific information about the dimensions, proportions, nature and sizes of explosive charges, and other engineering information in general for the ISI structures and methods, because they will vary due to location of the destruction pit, nature and quantity of materials being destroyed, and a myriad of other factors. However, to further illustrate the invention, FIGS. 4A and 4B present what may be understood as a typical, although non-limiting example in terms of specific quantities and dimensions of a specific implementation of the ISI invention.

It will be further appreciated that each box of nine CW projectiles 90 has five projectiles 90 pointing up and four projectiles 90 pointing down in an alternating pattern (up/down), and that there are four boxes on the bottom of container pile 60 and four on the top, in a square configuration as viewed from the top in FIG. 4B (bottom layer of boxes is not visible in FIG. 4B). In the interest of clarity, the boxes are not shown. They may be understood to be, in one non-limiting embodiment, wooden boxes with 1 inch thick walls. It should be realized that boxes are not needed for the invention to perform its function, but are used for ease of ordered placement of munitions in the pile 60 or pit 30.

Describing the details of the destruction zone 34 from the center outward, there are 8 tubes 94 filled with 2 lbs of foam High Explosive (i.e., light density HE), or other incidental HE charges, and end boosters. The 8 tubes are arranged in four pairs, end-to-end with a tetryl booster and electric detonator 96 centered within each pair. Each pair of tubes 94 is oriented vertically within each vertical box of projectiles 90 toward the center of the pile 60. On each of the top and bottom ends of the pairs of tubes 94 may be a foam attenuator 98 for purposes of reducing the shock wave intensity at particular directions at that instant of time.

Twenty-four bodies 100 filled with 0.44 lbs TNT booster and bursters are placed with the projectiles 90, three per box, some up-wardly pointing and some down-wardly pointing. These help better distribute the destructive blast throughout pile 60 and crush the munitions thereby helping to ensure complete destruction via long term pyrolysis.

In each upper corner of the pile 60 is a dual tetryl booster 102 and a delay fired corner tip dual electric detonator 104. Tetryl booster and electric detonators 96 and delay fired corner tip dual electric detonators 104 are all connected via firing lines 106 contained in pipe 108 to first and second dual remote firing units 66 and 68 (see FIG. 3).

The pile 60 may be encased on all sides in C4 implosion surface blocks 110. Explosive C4 blocks, when initiated, produce the prime implosion forces and source of heat or pyrolysis. C4 implosion surface blocks 110 in turn are covered by perforated PFTN/Deta sheets, 112 which form the cascading initiation function to detonate the C4 blocks 110. Over sheets 112 are sheet steel wave guides 114 to direct the detonation wave inwardly to create the uniform implosion of the pile 60. Bags of limestone (calcium carbonate) 116 are placed around this pile 60 to neutralize any escaping gases and liquids. Pile 60 may rest on four 8"×8"×80" wood support spaces (not shown) in between which the layer of thermite and implosion charges 58 are placed. The layer of thermite and implosion charges 58 may be in the form of twelve 6"×6"×24" blocks. Thick plywood walls 118 and floor 120 surround limestone bags 116 to support the pile 60 of munitions and explosives from cave-in while building Engineered ISI structure 44 up prior to back fill, which then traps all components in place. Beneath the floor 120 may be a 6" limestone base layer 122. A layer of limestone and gravel topfill 124 may be provided over the plywood top 118 for further purposes of chemical neutralization after implosion and collapse of the upper structures to crush and destroy CW projectiles 90.

Non-limiting values for various specifications of the ISI structure 44 shown in FIGS. 4A and 4B, which could be considered in the "small" amount category, may be as follows:

TABLE II

Possible Specifications for Destruction of 72 each 155 mm CW Projectiles

| | |
|---|---|
| HE Implosion Charges & Initiation Train | 274 lbs |
| Total High Explosive in Pile, including energetics in munitions | 300 lbs |
| Total Chemical Agent in Pile | 900 lbs |
| Total Thermite in Pile | 1500 lbs |
| Total Munitions Body Steel in Pile | 3960–5760 lbs |

Prior to detonation, the area surrounding the ISI destruction pit is evacuated to proper safety distance (quantity distance, QD). Following detonation, pit gas emission monitoring pipe 72 may be used to evacuate trapped gases to a nearby pollution abatement system 74 (PAS). The PAS 74 may be any standard engineered system for handling contaminated, evolved process gases, and may include, but is not necessarily limited to the combination of a quench tower, a chemical scrubber, an electrostatic precipitator, activated carbon/HEPA filter and the like. All harmful substances must be removed to required levels before the air is released to the atmosphere.

Remediation of ISI Structures

Once the ISI destruction pit 30 has cooled, and it is determined that there is no remaining vapor hazard, a small portion of the destruction pit 30 soil 70 and vitrified material 146 is excavated from the center of the pit 30. Should any "intact" munitions be found during excavation, they are removed and reprocessed in a subsequent Engineered ISI cycle. They are safe to handle at this point since they survived the extreme implosion forces and are therefore true "duds". Any still contaminated soil 148 and vitrified residues 146 found in this exploratory excavation are collected and processed through a nearby indirect fired rotary kiln (not shown) and thermally treated again by pyrolysis. Waste metals, salts, residues and liquids are pyrolyzed to a "5X" complete level of decontamination, as defined by the U.S. Surgeon General. A "5X" decontamination level is achieved for disassembled items through thermal treatment at 525° C. for 15 minutes.

The rotary kiln system has a complete PAS with arsenic extraction/encapsulation capable of meeting current U.S. Environmental Protection Agency (USEPA) regulations for hazardous waste treatment. Arsenic is recovered directly as a part of the kiln thermal treatment process. The recovered arsenic compounds are normally co-fed with clean dirt into a Plasma Arc Pyrolysis system (not shown) to be vitrified into a well dispersed, non-leachable solid metallic ceramic mass form suited for direct burial in a chemical landfill. Arsenic can also be refined as an option depending on determination of cost effectiveness. The clean metal parts discharged from the kiln may be recycled or sold as scrap or simply buried in a landfill. All waste products are tested to ensure they meet Toxic Characteristic Leach Procedure (TCLP) standards. TCLP certified wastes may be packaged in barrels and landfilled as hazardous waste. The clean kiln processed soil is used as overburden in subsequent Engineered ISI operations. As a last remediation step, nutrients are added to the kiln processed soil by bio-remediation composting processes prior to being returned to the excavation/munitions recovery pits.

Figure 6:
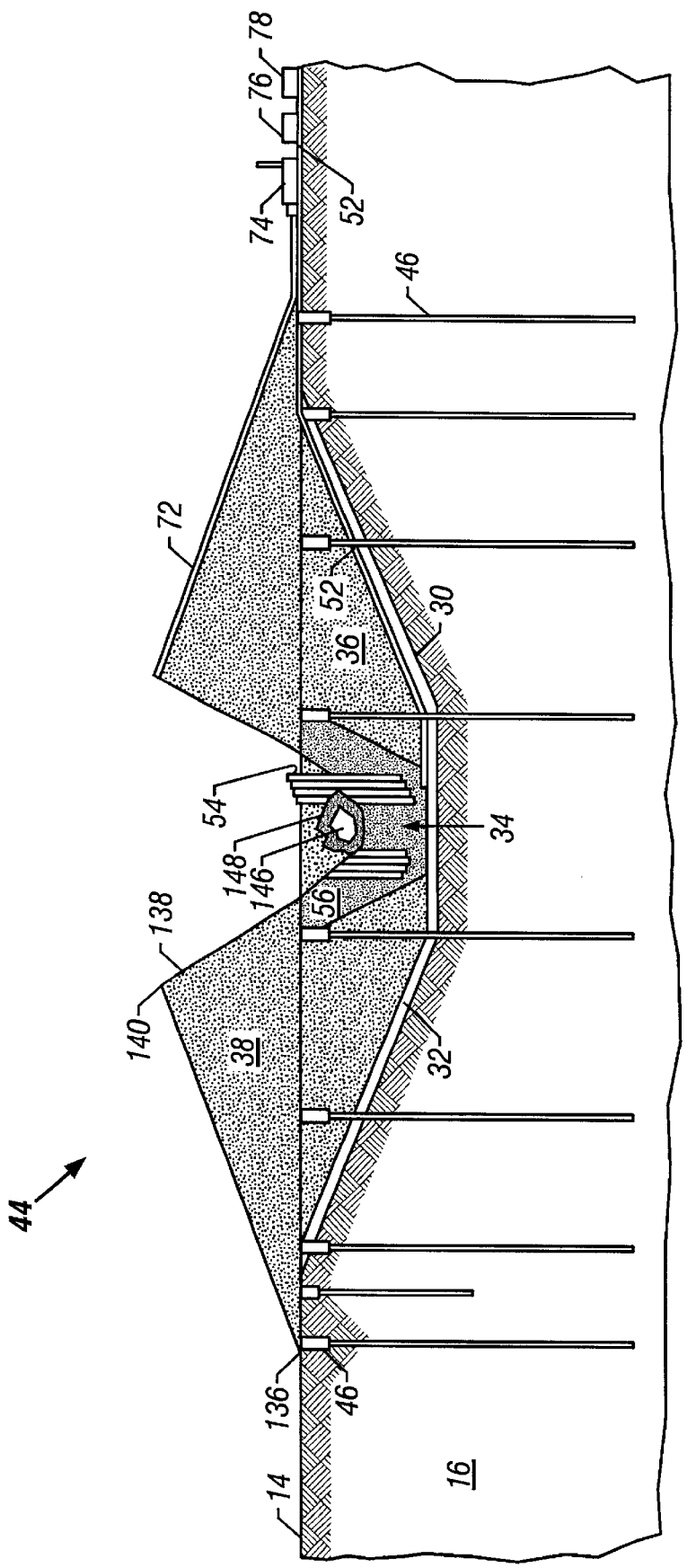
FIG. 6 is a schematic, vertical, cross-section of the destruction pit during remediation of FIG. 5.

Engineered ISI pits 30, and in some cases Direct ISI pits, may be reused a number of times following clean-out of the vitrified waste products 146 and contaminated soil 148 resulting from previous operations. FIG. 5 provides a plan section view of the destruction pit 30 during remediation showing the spiral haul road 130 entrance 132 and exit 134, and other features used to clean the pit and dispose of the remnants of the destroyed materials, and to prepare the pit for re-use. The toe 136 of overburden mound 38 is the outermost circular perimeter. Again, the ISI invention is not limited to a circular geometry when viewed from above, or even a concentric circular geometry as depicted in FIG. 6, although it is expected that this may be the most common implementation. If the buried munitions pile is elongated in configuration, the overburden would be constructed in similar fashion to gain equivalent overburden protection. FIG. 6 is a vertical cross-section of the destruction pit of FIG. 5 during remediation discussed above in which the same reference numerals are used for similar structures.

Cut and fill lines 138 indicates the outer periphery for removal, thermal treatment and replacement of potentially contaminated overburden 70 and 39, as described above with respect to the indirect fired rotary kiln. Perimeter edge 140 indicates the top of the heave-affected sand and gravel zone.

An overhead monorail system 142 can be used to convey material to and from ISI structure 44. Cross conveyer 144 would generally be removed after the placement of container pile 60 in destruction location 34.

Direct ISI

Figure 7:
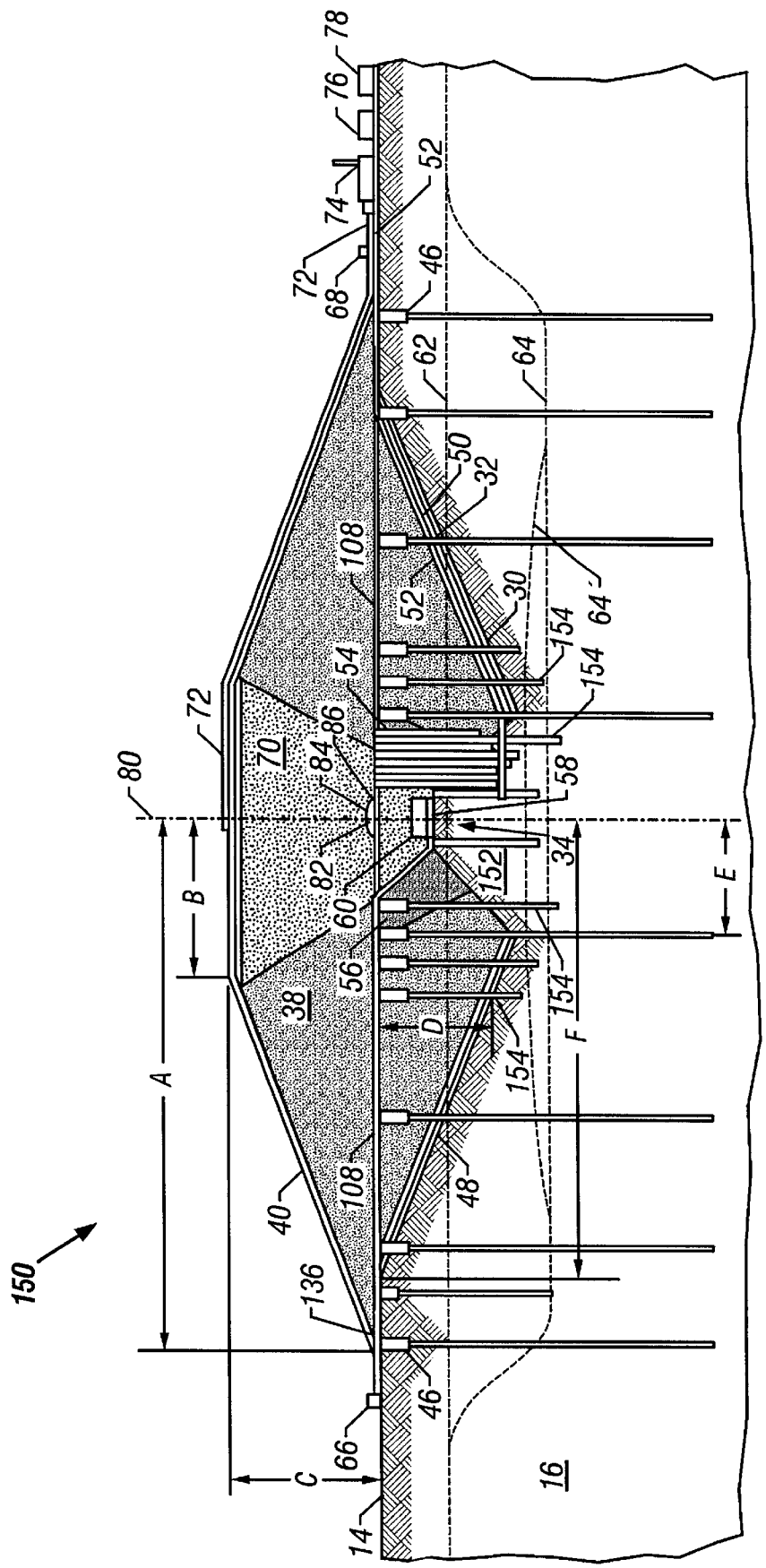
FIG. 7 is a schematic, vertical, cross-section of a Direct implosion pit in accordance with the ISI invention.

Referring to FIG. 7, construction and operation of the Direct ISI 150 is nearly the same as for the Engineered ISI embodiment 44. Identical reference numerals refer to similar, corresponding structures. Direct ISI 150 is used to treat buried or stored munitions, explosives and chemical warfare materials (CWM) that are believed to be too difficult and dangerous to be excavated, recovered, and transported from the burial pit or storage facility and processed by automatic handling methods in a typical factory environment. This includes "clumped" munitions which have fused or rusted together during prolonged storage or burial in a corrosion producing environment. Relocation and movement of the munitions is absent in direct ISI.

In preparation of the ISI pit 30, an area around the munitions buried/storage location is carefully cleared. Structural shoring 54 is put into the pit 30 near the pile 60 to prevent collapse of the excavated area. This structural shoring 54 may be vertical sheet piles or a retaining wall as shown, and may be made of corrugated steel or any other suitably strong and rigid material to help prevent collapse into the pit 30 during placement of munitions, explosives and surrounding chemicals. The mound of soil 152 supporting the munitions pile 60 (in one non-limiting embodiment) may be sensitive to undercutting. Therefore, alternative means for placing explosives, oxidizing materials and reactive chemicals near the base of the pile are used. Liquid cements and chemical slurries (for decontamination) are injected into the pre-drilled holes and wells 154, which may be angled in under the existing munitions pile 60. Wells 154 are fluid conduits for injecting and/or removing fluids, where fluid has its generally accepted meaning of either gas or liquid. This serves to form the base protective layer immediately beneath the munitions pile 60 similar to the layering of clay, limestone and silica layers used in the Engineered ISI embodiment. To compensate for the inability to safely place implosion explosives around and under the entire pile 60, additional thermite and explosives 58, and overburden 38 and 70 may be added to the pile 60 to better assure complete destruction, agent pyrolysis, and full containment of the forces produced without surface breaching. Of course, such additional measures must be placed near, adjacent to, and/or over the pile 60, rather than beneath it, to assure completion of the anticipated destruction process, unless, in some embodiments, it is sure that placement beneath pile 60 can be safely accomplished. The remainder of the construction, firing, monitoring and possible further remediation process steps are the same as with the Engineered ISI process. It is expected that the non-limiting values for dimensions A–E given in Table I for the Engineered ISI embodiment would apply approximately equally to the Direct ISI embodiment, although the values may be increased slightly.

Direct ISI pits 30 may be reused following clean-out of the vitrified waste products 146 and soil 148 resulting from the initial Direct ISI operation. They effectively become Engineered ISI pits 30 in subsequent operations. Some improvements, such as covering the entire bottom surface with a pliant plastic sheet 48 and thick layer of clay 50, and more precise placement of pipes 52, 72, and 108 may be desired.

It is anticipated that in some embodiments of Direct ISI that the dangerous materials to be destroyed do not already exist in a pit, but are on or above ground 16. In such a situation, it is anticipated that the Direct ISI structure would be built upward from ground level 14 around the dangerous materials in the location taking great care not to disturb their position.

Summary of ISI Technology

ISI completely or substantially satisfies environmental concerns associated with current open burn/open pit (OB/OD) detonation techniques and provides numerous operations and safety advantages over OB/OD. In Situ Implosion (ISI) provides a safe, low risk, and low cost method for effectively destroying old, buried chemical and conventional munitions. ISI is also effective for disarming and destroying paramilitary and terrorist bombs and explosives, and for demilitarizing and decontaminating recovered chemical warfare materials. ISI satisfies environmental concerns associated with OB/OD and provides numerous operations and safety advantages over OB/OD. The advantages may be achieved or are expected to be achieved, include, but are not limited to:

Large absolute destruction capacity;
Can destroy conventional explosive and/or CWM, and other dangerous materials;
Can destroy small to large quantities in a single event;
Mobile equipment easy to move from site to site;
Fully contained weapons destruction;
Full containment of explosive and process off gases;
Reduced risk from accidental explosion and exposure to toxic chemical agents;
Reduced handling, transport, and processing of explosively configured chemical filled and conventional munitions;
Eliminates requirement to physically disarm and disassemble explosively configured and chemical agent filled munitions prior to destruction/decontamination, i.e. can handle buried CWM "as is";
Complete neutralization of toxic and industrial organic chemical agents;
Proven capability based on prior experience with military OB/OB;
Non-breaching pyrolysis in caustic backfill;
Collects arsenic compounds in PAS for disposal or recycle;
Can recycle recovered clean materials;
No liquid waste discharge (when combined with rotary kiln and Plasma Arc Process);
Liquid/vapor barriers incorporated into design prevent seepage into underground aquifers; and
ISI can be used to destroy a broad, diverse spectrum of hazardous chemical materials at the same time, at a wide variety of discovery, storage and destruction sites.

The improvements over current OB/OD processes and practices, include, but are not necessarily limited to:

An earthen overburden is placed on top of the destruction pit, or pile for full containment of explosive forces, metal fragments, chemicals and process gases.
A continuous monitoring for process off gases is conducted.
Liquid/vapor barriers (e.g. compacted clay and non-permeable liner) are used to prevent seepage into underground aquifers.
Chemical oxidizing reagent materials are placed in the ISI pit or around the pile to "fix" and react with and/or neutralize toxic liquids, solids and reaction gases or vapors, which form non-toxic, organic salts. These materials are recovered for further processing and disposal as hazardous wastes.
Implosion forces are directed and controlled through emplacement of blast wave guides and shock attenuating media in and around the destruction pit.

It is expected that the ISI process and structures may be used by military, police and anti-terrorist organizations for the destruction, decontamination, and disposal of conventional munitions and chemical agent-filled munitions and other chemical warfare materials.

In the foregoing specification, the invention has been described with reference to specific embodiments thereof, and has been demonstrated as effective in providing structures and procedures for the destruction of dangerous materials including, but not limited to, chemical and conventional munitions, bombs and explosives, chemical warfare materials, and the like. However, it will be evident that various modifications and changes can be made thereto without departing from the broader spirit or scope of the invention as set forth in the appended claims. Accordingly, the specification is to be regarded in an illustrative rather than a restrictive sense. For example, specific geometries, sizes, proportions and relationships of the structures illustrated and described, but not specifically identified or tried in configuration to destroy dangerous materials, are anticipated to be within the scope of this invention.

It is also possible, of course, for Direct ISI and Engineered ISI to be combined, that is, dangerous materials to be destroyed may be transported to a Direct ISI site where dangerous materials exist which are too dangerous to be moved or relocated.

A list of features of the ISI method and structures includes, but is not limited to the following presented in Table III. Certainly not all of these features are considered required in the basic ISI process, and not all of these features have been described herein in equal detail.

TABLE III

Features of the ISI Method and Structures

1. Underground Implosion Treatment of Toxic/Hazardous Chemical Materials
2. Underground Implosion Treatment of Buried Toxic/Hazardous Chemical Materials
3. Underground Implosion Treatment of Toxic/Hazardous Combined High Explosive and Chemical Filled Weapons
4. Underground Implosion Treatment of Buried Toxic/Hazardous Combined High Explosive and Chemical Filled Weapons
5. Underground Implosion Treatment of Toxic/Hazardous Combined High Explosive, Live Propellant and Chemical Filled Weapons
6. Underground Implosion Treatment of Buried Toxic/Hazardous Combined High Explosive, Live Propellant and Chemical Filled Weapons
7. Underground Implosion Treatment of Toxic/Hazardous Combined/Fused, High Explosive, Live Propellant and Chemical Filled Weapons
8. Underground Implosion Treatment of Buried Toxic/Hazardous Combined Fused, High Explosive, Live Propellant and Chemical Filled Weapons
9. Non-Breaching Subsurface Implosion Processing of Chemical Materials Using Earth as a Reaction Chamber
10. Non-Breaching Subsurface Implosion Processing of Chemical Weapons (CW) Using Earth as a Reaction Chamber
11. Non-Breaching Subsurface Implosion Processing of Explosive Ordinance Using Earth as a Reaction Chamber
12. Non-Breaching Subsurface Implosion of CW and Surface Collection, Monitoring and Release of Excess Evolved Gasses
13. Non-Breaching Subsurface Implosion of CW and Surface Collection, Monitoring, Treatment and Release of Excess Evolved Gasses
14. Buried Implosion Induced Combustion Destruction of Chemical Materials
15. Buried Implosion Induced Combustion Destruction of CW
16. Buried Implosion Induced Combustion Destruction of Explosive Ordnance
17. Buried Implosion Pyrolysis of Chemical Materials
18. Buried Implosion Pyrolysis of CW
19. Buried Implosion Pyrolysis of Explosive Ordinance
20. In-Situ Buried Thermal Treatment of Chemical Materials
21. In-Situ Buried Thermal Treatment of Chemical Contaminated Hardware
22. In-Situ Buried Thermal Treatment of CW Agents
23. In-Situ Buried Thermal Treatment of CW Agent Contaminated Hardware
24. In-Situ Buried Thermal Treatment of CW Agents, Energetics and CW Agent Contaminated Hardware
25. In-Situ Buried Thermal Treatment of Explosive Ordnance
26. In-Situ Buried Thermal Treatment of Explosive Contaminated Hardware
27. In-Situ Buried Chemical Reaction Treatment of Chemical Materials
28. In-Situ Buried Chemical Reaction Treatment of Chemical Contaminated Hardware
29. In-Situ Buried Chemical Reaction Treatment of CW Agents
30. In-Situ Buried Chemical Reaction Treatment of CW Agent Contaminated Hardware
31. In-Situ Buried Chemical Reaction Treatment of Explosive Ordnance
32. In-Situ Buried Chemical Reaction Treatment of Explosive Contaminated Hardware
33. In-Situ Buried Vitrification of Chemical Residues and Residual Materials
34. In-Situ Buried Vitrification of CW Residues and Residual Materials
35. In-Situ Buried Vitrification of Explosive Ordinance Residues and Residual Materials
36. Products of Buried Implosion Process Thermally Bind Together Into Solid Metallic Glassy Slag Mass Form
37. Engineered Subsurface Implosion Treatment of Hazardous Chemicals Using Explosive Detonation Wave Shaper Technology
38. Engineered Subsurface Implosion Treatment of CW Using Explosive Detonation Wave Shaper Technology
39. Engineered Subsurface Implosion Treatment of Explosive Ordnance Using Explosive Detonation Wave Shaper Technology
40. Buried Implosion Type High Order Detonating Explosion Process Produces Crushing of Active Chemical Components
41. Buried Implosion Type High Order Detonating Explosion Process Produces Crushing of Active CW Components
42. Buried Implosion Type High Order Detonating Explosion Process Produces Crushing of Active Explosive Ordnance Components

TABLE III-continued

Features of the ISI Method and Structures

43. Buried Implosion Type High Order Detonating Explosion Process Produces Fracturing of Active Chemical Components
44. Buried Implosion Type High Order Detonating Explosion Process Produces Fracturing of Active CW Components
45. Buried Implosion Type High Order Detonating Explosion Process Produces Fracturing of Active Explosive Ordnance Components
46. Buried Implosion Type High Order Detonating Explosion Process Produces Complete Destruction of Active Chemical Components
47. Buried Implosion Type High Order Detonating Explosion Process Produces Complete Destruction of Active CW Components
48. Buried Implosion Type High Order Detonating Explosion Process Produces Complete Destruction of Active Explosive Ordnance Components
49. Buried Implosion Type High Order Detonating Explosion Process Augmented by Release of Other Energy Forms Produces Complete Destruction of Active Chemical Components
50. Buried Implosion Type High Order Detonating Explosion Process Augmented by Release of Other Energy Forms Produces Complete Destruction of Active CW Components
51. Buried Implosion Type High Order Detonating Explosion Process Augmented by Release of Other Energy Forms Produces Complete Destruction of Active Explosive Ordnance Components
52. Buried Implosion Type High Order Detonating Explosion Process Augmented by Release of Other Energy Forms Produces Melting of Active Chemical Components
53. Buried Implosion Type High Order Detonating Explosion Process Augmented by Release of Other Energy Forms Produces Melting of Active CW Components
54. Buried Implosion Type High Order Detonating Explosion Process Augmented by Release of Other Energy Forms Produces Melting of Active Explosive Ordnance Components
55. Non-Breaching Earth Overburden Mass Forms Predictable Reaction Chamber in Which Buried Implosion Process Functions
56. Non-Breaching Earth Overburden Mass Forms Tunable Reaction Chamber in Which Buried Implosion Process Functions
57. Non-Breaching Earth Overburden Mass Forms Constructable Reaction Chamber in Which Buried Implosion Process Functions
58. Non-Breaching Earth Overburden Mass Forms Durable Reaction Chamber in Which Buried Implosion Process Functions
59. Non-Breaching Earth Overburden Mass Forms Inspectable Reaction Chamber in Which Buried Implosion Process Functions
60. Non-Breaching Earth Overburden Mass Forms Re-Constructable Reaction Chamber in Which Buried Implosion Process Functions
61. Non-Breaching Earth Overburden Mass Forms Environmentally Remediable Reaction Chamber in Which Buried Implosion Process Functions
62. Buried Implosion Process Trades-Off Use of High Strength Structural Material Envelope for Thick Massive Bulk Material Envelope to Contain, Absorb and Direct the High Energy Pulse Released
63. Earth Overburden and Special Engineered Chemical Backfill Provide Physical Containment to Buried Implosion Process by Localizing the Physical Movement and Radial Spread of Combustion Products, Solid Particles and Projected Fragments
64. Earth Overburden and Special Engineered Chemical Backfill Provide Massive Confinement of Forces Produced Locally by Buried Implosion Process
65. Earth Overburden and Special Engineered Chemical Backfill Provide Reflective Concentration of Forces Produced Locally by Buried Implosion Process
66. Earth Overburden and Special Engineered Chemical Backfill Provide Refractive Concentration of Forces Produced Locally by Buried Implosion Process
67. Earth Overburden and Special Engineered Chemical Backfill Provide Reflective Dispersal of Forces Produced Locally by Buried Implosion Process
68. Earth Overburden and Special Engineered Chemical Backfill Provide Refractive Dispersal of Forces Produced Locally by Buried Implosion Process
69. Massive Confinement of Earth Overburden and Special Engineered Chemical Backfill Faced Locally by Buried Implosion Process Maximizes Conversion of Chemical Energy from Energetic Materials to Shock, Compression, Work and Thermal Energy Forms
70. Buried Implosion Process Partitions Converted Chemical Energy to Shock, Compression, Work and Thermal Energy Forms in Accordance with Size, Content and Configuration of Massive Earth Overburden and Special Chemical Backfill Used
71. Pre-Selected Localized Chemical Material Backfill Around Implosion Charge Provides Excess Chemical Reactants to Oxidize, Reduce, Combine,

TABLE III-continued

Features of the ISI Method and Structures

Convert, Neutralize, Thermally Treat, React with, Stabilize and Render Inert the Affected Hazardous Chemicals, CW Agents, Metals and Residues Involved 72. Backfill Chemicals Used in Buried Implosion Process Selected from Commonly Available Naturally Occurring Bulk Materials
73. Absorption of Released Explosive Blast Energy from Buried Implosion Process Results in Localized Plastic and Elastic Deformation in a Portion of Compressed Engineered Chemical Backfill Media Due to Complementary Dynamic Response Characteristics
74. Absorption of Released Explosive Blast Energy from Buried Implosion Process Results in Localized Crushing and Pulverization of a Portion of Engineered Chemical Backfill Media
75. Extreme Impulse and Thermal Loading of Engineered Chemical Backfill Surrounding Buried Implosion Process Results in Creation of a Highly Densified Portion of Residual Material Located Nearest the Starting Point
76. Extreme Impulse and Thermal Loading of Engineered Chemical Backfill Surrounding and including the Buried Implosion Process Residues Results in a Melted Composite Mass of the Portion of Residual Material Located Nearest the Starting Point if Energy Released is Sufficient
77. Adsorption of High Pressure Gas Products of Combustion Produced from Buried Implosion Process Occurs in Packing Void Volume of Engineered Chemical Backfill Media
78. Attenuation of Explosive Detonation Shock Pressure Produced from Buried Implosion Process by Means of Passing Through Porous Engineered Chemical Backfill Media
79. Resistance to Combustion Product Gas and Particulate Flow Produced by Buried Implosion Process Occurs by Passing Through Porous Engineered Chemical Backfill Media
80. Resistive Backpressure of Massive Overburden and Backfill Surrounding Buried Implosion Process Slowly Bleeds Down Overpressure Gasses Upward Randomly Through Blast Affected Overburden to Exit Mound Surface Above Pit
81. Resistance to Soil Overburden Breaching from Buried Implosion Process by Absorbing Work While Heaving Overburden Mass Upward and Outward Under the Influence of Expanding Explosion Impulse Coupling with the Drag Force Lifted Soil
82. Exceeding Compacted Soil Overburden Shear Strength by Buried Implosion Process Causes Heaving Impulse Affected Mass of Soil Located Overhead to Spread Outward and Increases the Apparent Compressive Loading Within a Conical Cratering Zone Above
83. Non-Breaching Overburden Heaving Impulse and Gravity Induced Back-Fall from Buried Implosion Process is Partly Converted Back to Thermal Energy Equivalent Locally
84. Compression Energy on Backfill Mass Around Buried CW Pile Produced by Buried Implosion Process is Partially Converted Back to Thermal Energy Equivalent Locally
85. Mass Flow Energy Coupled Mechanically Filtering of Particulate Residues and Solid Products of Combustion Produced from Buried Implosion Process by Means of Passing Through Local Presence of Granular Engineered Chemical Backfill Media
86. Particulate Residues and Solid Products of Combustion Produced by Buried Implosion Process and the Neighboring Selected Chemical Backfill Forceably Mix Together Locally In-Situ
87. Chemical Reaction by Means of Forced Mechanical Mixing Contact Between Combustion Products and Particulates and Engineered Solid Chemical Reactants Result from the Self-Heating Buried Implosion Process
88. Chemical Reaction by Means of Forced Mechanical Mixing Contact Between Combustion Products and Particulates and Engineered Solid Chemical Reactants Result from the Self-Heating Buried Implosion Process Augmented by Other Forms of Energy Released
89. Chemical Energy Released from Trapped Non-Breaching Buried Implosion Process Ultimately Converts to Thermal Energy In-Situ and Melts the Target Material if Energy Released is Sufficient to do so
90. Long Duration, High Temperature Pyrolysis Treatment Occurs In-Situ by Means of Self-Heated Locally Constrained Implosion Process Residues and Combustion Products Within the Engineered Chemical Backfill Media
91. Long Duration, High Temperature Pyrolysis Treatment Occurs In-Situ by Means of Self-Heated Locally Constrained Implosion Process Residues and Combustion Products Within the Engineered Chemical Backfill Media as Augmented by Release of Additional Energy Provided
92. Vitrified Solid Mass of Entrained Residues Produced by Buried Implosion Process Occurs Locally Within the Engineered Chemical Backfill Media
93. Non-Leachable Metallic Glassy Slag Resulting from Buried Implosion Process Chemically Binds Treated Chemical Agent Residues Together in a Density Graduated Solidified Form
94. Insoluble Compact Solid Form of Chemical Agent Residues Produced and

TABLE III-continued

Features of the ISI Method and Structures

Localized by In-Situ Engineered Implosion Process Occurs Within Selected Chemical Backfill Media
95. Provision for Impervious Self Sealing and Healing Buried Implosion Process Basin Liner for Prevention of Contamination Spread From Center of Destruct Action Into the Groundwater Table
96. Provision for Fluids Drainage of Basin Located Under Buried Implosion Process for Control of Engineered Chemical Backfill Media Performance
97. Provision for Gas Purging of Basin Located Under Buried Implosion Process for Control of Engineered Chemical Backfill Media Performance
98. Provision for Direct Injection of Water Around and Into Buried Implosion Process Pit and Inside Containment Basin Through Drilled Wells or Pipes for Modification of In-Situ Chemistry
99. Provision for Direct Injection of Special Reactive/Decontamination Chemicals Around Buried Implosion Process Pit and Inside Containment Basin Through Drilled Wells for Modification of In-Situ Chemistry
100. Provision for Direct Injection of Cementitious Materials Around and Near Buried Implosion Process Pit for Local Cave-in Protection of Operating Crew
101. Provision for Direct Injection of Cementitious Materials into, Nearby and Below Buried Implosion Process Containment Basin for Improvement of Fluid Containment and Water In-Leakage at Basin Boundary
102. Provision for Direct Injection/Placement of Cementitious Materials Around and Near Buried Implosion Process Pit for Adjustment and Control of Impulse Produced by Explosive Blast
103. Provision for Tied Down Sealed Impervious Cover on Top of Earthen Overburden to Prevent Gas Emissions from Buried Implosion Process from Escaping Untreated into the Atmosphere
104. Provision for Sprayed on Impervious Cover on Top of Earthen Overburden to Prevent Gas Emissions from Buried Implosion Process from Escaping Untreated into the Atmosphere
105. Provision for Processing of Collected Gaseous Emissions Trapped Under Overburden Mound Cover Membrane Resulting from Buried Implosion Process Through a Broad Spectrum Pollution Abatement System Before Release to the Atmosphere as Clean Air
106. Provision for Installation of Chemical Contamination Test and Monitoring Wells Near and Around Site of Buried Implosion Process for Health Safety and Pollution Abatement
107. Provision for Multiple Re-Use of Engineered In-Situ Implosion Process Site for Improved Cost Effectiveness
108. Provision for Re-Use of Special Fill and Overburden Materials On-Site and Between Sites for Improved Cost Effectiveness
109. Provision for Monitoring, Excavation, Transport and Thermal Processing of Contaminated Overburden and Chemical Backfill Media in Off-Site Treatment Process and Return of Sterilized Material Back to Engineered Implosion Process Pit for Re-Use
110. Provision for Additional Thermal Processing of Slightly Contaminated Overburden and Backfill Materials Subject to Safe Workplace Determination for Process Shortcut Cost Effectiveness
111. Provision for Use of Selected Low Dust Content Overburden and Backfill Materials in Blast Affected Zone for Buried Implosion Process Cost Effectiveness
112. Provision for Installation of Drilled De-Watering Wells Near and Around Site of Buried Implosion Process for Control/Temporary Lowering of High Local Water Table
113. Provision for Installation of Drilled Fiber-Bearing Cement Slurry Wells for Construction of Underground Retention Walls and Barriers Around Buried Implosion Process Pit for Protection of Operating Crew
114. Provision for Installation of Driven Sheet Piles and Support Piles for Construction of Underground Retention Walls, Barriers and Structural Supports Around and Over Buried Implosion Process Pit
115. Provision for Placement of Packaged or Injection of Oxygen Rich Chemicals Around and Near Buried implosion Process Pit for Adjustment of Local Thermal Combustion Chemistry
116. Provision for Post Event Survey and Excavation of Individual Unexploded and/or Un-Destroyed CW from Previous Buried Implosion Process and Safely Re-Burying for Additional Implosion Process Treatment
117. Provision for Placing Dispersed Interconnected Multiple Timed Explosive Devices On the Outside and Corner Tips of the Buried Implosion Process High Explosive Envelope to Amplify the Inward Incident Impulse Value and Improve the Ultimate Destruction of the Pile of Munitions
118. Provision for Placing Specially Shaped Explosive Devices Around the Base of the Buried Implosion Process High Explosive Envelope to Amplify the Inward Incident Impulse Value and Improve the Ultimate Destruction of the Pile of Munitions
119. Provision for Inserting Timed and Shaped Explosive Devices Inside of the Buried Implosion Process to Amplify the Inward Incident Impulse Value and Improve the Short Term Shattering, Pulverizing, Crushing,

TABLE III-continued

Features of the ISI Method and Structures

Penetration, Perforation, Exposure, Reaction, Combustion and Ultimate Destruction of the Innermost Portion of the Pile of Munitions 120. Provision for Inserting Special Heat Producing Devices and Materials Beneath/Around the Base of the Buried Implosion Process to Augment the Overall Thermal Energy Release and Improve the Ultimate Destruction of the Pile of Munitions
121. Provision for Injecting Special Liquified Explosive Materials Inside the Buried Implosion Process to Improve the Long Term Heating, Melting, Pyrolysis, Vitrification and Ultimate Destruction of the Innermost Portion of the Pile of Munitions
122. Provision for Inserting Structural Devices on Top of and Around the Buried Implosion Process to Absorb the Incident Impulse and Reduce the Transmitted Impulse Loading into the Overburden and Backfill Material
123. Provision for Inserting Structural Devices on Top of and Around the Buried Implosion Process to Absorb and Redistribute the Incident Impulse Loading into the Overburden and Backfill Material
124. Provision for Inserting Empty Shaped Cavities on Top of and Around the Buried Implosion Process to Absorb the Incident Impulse and Reduce the Transmitted Impulse Loading into the Overburden and Backfill Material
125. Provision for Inserting Empty Cavities on Top of and Around the Buried Implosion Process to Absorb the Incident Impulse, Reshape and Re-Direct the Transmitted Impulse Loading into the Overburden and Backfill Material
126. Provision for Inserting Hard Surface Wave Guides on Top of and Around the Buried Implosion Process to Reflect and Refract the Incident Impulse and Reshape the Transmitted Impulse Loading into the Overburden and Backfill Material
127. Provision for Inserting Heavy Mass Wave Guides on Top of and Around the Buried Implosion Process to Absorb and Deflect the Incident Impulse and Reshape the Transmitted Impulse Loading into the Overburden and Backfill Material
128. Provision for Adding Distributed and Delay Fired Secondary Explosive Charges on Top of and Spaced Around the Buried Implosion Process to Counteract and Deflect the Original Incident Impulse and Reshape the Transmitted Impulse Loading into the Overburden and Backfill Material
129. Provision for Post Excavating Buried Implosion Process Residues and Performing Secondary Thermal Treatment Sterilization of the Soils, Adding Nutrients, Perforating the Basin Envelope and Re-Filling the Basin, Planting Native Vegetation for Site Remediation Purposes

We claim:

1. A structure for the destruction of dangerous materials comprising:
   a destruction location, where the destruction location contains the dangerous materials;
   at least one durable, sealed, pliant membrane beneath at least a portion of the destruction location;
   an overburden mound above the destruction location; and
   at least one explosive charge adjacent the dangerous materials capable of subjecting the dangerous materials to crushing forces and heat for a period of time sufficient to destroy the dangerous materials by pyrolysis.

2. The structure of claim 1 where the destruction location is a destruction pit below ground level.

3. The structure of claim 1 further comprising at least one durable, sealed, plastic membrane above at least a portion of the destruction location and the overburden mound.

4. The structure of claim 1 further comprising at least one fluid conduit for evacuating fluids from beneath the destruction location.

5. The structure of claim 1 further comprising a layer of clay beneath at least a portion of the destruction location, the layer of clay being over the durable, sealed, pliant membrane.

6. The structure of claim 1 further comprising at least one fluid conduit for injecting fluids to the destruction location.

7. A structure for the destruction of dangerous materials comprising:
   a destruction location, where the destruction location contains the dangerous materials which have not and will not be moved;
   at least one durable, sealed, pliant membrane beneath at least a portion of the destruction location;
   an overburden mound above the destruction location; and
   at least one explosive charge adjacent the dangerous materials capable of subjecting the dangerous materials to crushing forces and heat for a period of time.

8. The structure of claim 7 further comprising at least one durable, sealed, plastic membrane above at least a portion of the destruction location and the overburden mound.

9. The structure of claim 7 further comprising at least one fluid conduit for evacuating fluids from beneath the destruction location.

10. The structure of claim 7 further comprising a layer of clay beneath at least a portion of the destruction location, the layer of clay being over the durable, sealed pliant membrane.

11. The structure of claim 7 further comprising at least one fluid conduit for injecting fluids to the destruction location.

12. A structure for the destruction of dangerous materials comprising:
    a destruction pit below ground level, where the destruction pit contains the dangerous materials that have been transported to the destruction pit;
    at least one durable, sealed, pliant membrane beneath at least a portion of the destruction pit;
    an overburden mound above the destruction pit; and
    at least one explosive charge adjacent the dangerous materials capable of subjecting the dangerous materials to crushing forces and heat for a period of time.

13. The structure of claim 12 further comprising at least one durable, sealed, plastic membrane above at least a portion of the destruction pit and the overburden mound.

14. The structure of claim 12 further comprising at least one fluid conduit for evacuating fluids from beneath the destruction pit.

15. The structure of claim 12 further comprising a layer of clay beneath at least a portion of the destruction pit, the layer of clay being over the durable, sealed pliant membrane.

16. The structure of claim 12 further comprising at least one fluid conduit for injecting fluids to the destruction pit.

17. A method for the destruction of dangerous materials comprising:

provifing dangerous materials to be destroyed at a destruction location;

providing at least one durable, sealed, pliant membrane beneath at least a portion of the destruction location;

providing an overburden mound above the destruction location;

providing at least one explosive charge adjacent the dangerous materials;

detonating the explosive charge to crush, heat and destroy the dangerous materials; and removing any contaminated gases, liquids or solids from the destruction location.

18. The method of claim 17 where the destruction location is below ground level.

19. The method of claim 17 further comprising providing at least one durable, sealed, plastic membrane above at least a portion of the destruction location and the overburden mound.

20. The method of claim 17 further comprising evacuating fluids from beneath the destruction location via at least one fluid conduit.

21. The method of claim 17 further comprising providing a layer of clay beneath at least a portion of the destruction location, the layer of clay being over the durable, sealed pliant membrane.

22. The method of claim 17 further comprising injecting fluids to the destruction location via at least one fluid conduit.

23. A method for the destruction of dangerous materials comprising:

constructing a destruction pit below ground level;

placing dangerous materials to be destroyed into the destruction pit;

providing at least one durable, sealed, pliant membrane beneath at least a portion of the destruction pit;

providing an overburden mound above the destruction pit;

providing at least one explosive charge adjacent the dangerous materials;

detonating the explosive charge to crush, heat and destroy the dangerous materials; and removing any contaminated gases, liquids or solids from the destruction pit.

24. The method of claim 23 further comprising providing at least one durable, sealed, plastic membrane above at least a portion of the pit location and the overburden mound.

25. The method of claim 23 further comprising evacuating fluids from beneath the destruction pit via at least one fluid conduit.

26. The method of claim 23 further comprising providing a layer of clay beneath at least a portion of the destruction pit, the layer of clay being over the durable, sealed pliant membrane.

27. The method of claim 23 further comprising injecting fluids to the destruction pit via at least one fluid conduit.

28. A method for the destruction of dangerous materials comprising:

locating dangerous materials to be destroyed at a destruction location;

providing at least one durable, sealed, pliant membrane beneath at least a portion of the destruction location;

providing an overburden mound above the destruction location;

providing at least one explosive charge adjacent the dangerous materials;

detonating the explosive charge to crush, heat and destroy the dangerous materials; and removing any contaminated gases, liquids or solids from the destruction location.

29. The method of claim 28 further comprising providing at least one durable, sealed, plastic membrane above at least a portion of the destruction location and the overburden mound.

30. The method of claim 28 further comprising evacuating fluids from beneath the destruction location via at least one fluid conduit.

31. The method of claim 28 further comprising injecting fluids to the destruction location via at least one fluid conduit.

* * * * *